(12) United States Patent
Quelven et al.

(10) Patent No.: US 10,280,776 B2
(45) Date of Patent: May 7, 2019

(54) TURBINE ASSEMBLY OF AN AIRCRAFT TURBINE ENGINE

(71) Applicant: Safran Aircraft Engines, Paris (FR)

(72) Inventors: Damien Bernard Quelven, Moissy-Cramayel (FR); Jean-Baptiste Vincent Desforges, Moissy-Cramayel (FR); Maurice Guy Judet, Moissy-Cramayel (FR); Ba-Phuc Tang, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 169 days.

(21) Appl. No.: 15/536,096

(22) PCT Filed: Dec. 17, 2015

(86) PCT No.: PCT/FR2015/053597
§ 371 (c)(1),
(2) Date: Jun. 14, 2017

(87) PCT Pub. No.: WO2016/097632
PCT Pub. Date: Jun. 23, 2016

(65) Prior Publication Data
US 2017/0328227 A1 Nov. 16, 2017

(30) Foreign Application Priority Data
Dec. 17, 2014 (FR) ...................................... 14 62655

(51) Int. Cl.
*F01D 11/02* (2006.01)
*F01D 11/00* (2006.01)
(Continued)

(52) U.S. Cl.
CPC .............. *F01D 11/001* (2013.01); *F01D 5/02* (2013.01); *F01D 5/082* (2013.01); *F01D 5/087* (2013.01);
(Continued)

(58) Field of Classification Search
CPC ........ F01D 11/001; F01D 11/02; F01D 11/04; F01D 11/06; F01D 11/006; F01D 5/082; F01D 5/087; F05D 2260/22141
(Continued)

(56) References Cited

U.S. PATENT DOCUMENTS 4,759,688 A 7/1988 Wright et al.
5,833,244 A * 11/1998 Salt ....................... F01D 11/001
277/421

(Continued)

FOREIGN PATENT DOCUMENTS

EP 0919698 6/1999
EP 1450005 8/2004

OTHER PUBLICATIONS

SNECMA, "French Preliminary Search Report," FR Application No. 1462655 (dated Oct. 7, 2015) (with English translation cover sheet).
(Continued)

*Primary Examiner* — Marguerite J McMahon
(74) *Attorney, Agent, or Firm* — Womble Bond Dickinson (US) LLP

(57) ABSTRACT

The present invention relates to a turbine assembly (10) of a turbine engine (1), comprising at least: a first bladed rotor (12), a bladed stator (13) and a second bladed rotor (14) arranged in series, the rotors (12, 14) being mounted on a shaft (2); a sealing plate (20) extending between the stator (13) and the shaft (2) and separating a first recess (C1) arranged between the first rotor (12) and the stator (13), from
(Continued)

a second recess (C2) arranged between the stator (13) and the second rotor (14); and pressure-reducing means (300, 31) positioned inside the first recess (C1), the assembly being characterized in that said pressure-reducing means (300, 31) comprise a plurality of substantially radial recompression fins (300) extending into the first recess (C1).

11 Claims, 6 Drawing Sheets

(51) Int. Cl.
    *F01D 5/08*     (2006.01)
    *F01D 5/02*     (2006.01)
    *F01D 9/04*     (2006.01)

(52) U.S. Cl.
    CPC ............ *F01D 9/041* (2013.01); *F01D 11/006* (2013.01); *F01D 11/02* (2013.01); *Y02T 50/671* (2013.01); *Y02T 50/676* (2013.01)

(58) Field of Classification Search
    USPC ................................ 415/173.7, 174.4, 174.5
    See application file for complete search history.

(56) References Cited

U.S. PATENT DOCUMENTS

| | | | |
|---|---|---|---|
| 6,217,279 B1* | 4/2001 | Ai | F01D 9/065 415/110 |
| 2009/0129916 A1* | 5/2009 | Young | F01D 11/001 415/115 |
| 2017/0051622 A1* | 2/2017 | Smith | F01D 11/001 |

OTHER PUBLICATIONS

SNECMA, "International Search Report," PCT Application No. PCT/FR2015/053597 (dated Apr. 1, 2016) (with English translation cover sheet).

* cited by examiner

TURBINE ASSEMBLY OF AN AIRCRAFT TURBINE ENGINE

GENERAL TECHNICAL FIELD

The present invention relates to a turbine of a turbine engine.

PRIOR ART

In order to eject a quantity of air of sufficient mass, an increase in pressure at constant speed is provided by the intake compressor. A considerable release of energy is then caused by the combustion of a fuel, generally kerosene, in the oxygen of the air that passes through the machine.

Turbine engines comprise a turbine recovering a portion of the energy released by fuel combustion to drive some rotating elements, including the compressor located at the air intake.

In bypass type turbine engines of the type of that shown in FIG. 1, the turbine generally consists of one or more high pressure (HP) stages (stator-rotor) and one or more low-pressure (BP) stages.

In particular, it is observed that in HP turbines, those having two stages are among those having the best performance.

However, one problem specific to HP turbines, two stage HP turbines for example, is controlling fluid-tightness between the two inter-disk recesses. Referring to FIG. 2, which represents a known two-stage turbine 10, the first stage formed by a bladed stator 11 and a first bladed rotor 12 (a bladed disk) are shown, and the second stage formed by a second bladed stator 13 and a second bladed rotor (14) (another bladed disk). The assembly of stators 11, 13 forms the fixed blading (the stators 11, 13 are attached to a casing of the turbine engine 1), and the assembly of rotors 12, 14 forms the movable blading (the rotors 12, 14 are mounted on a shaft 2).

The two inter-disk recesses mentioned are arranged on either side of the second stator 13: upstream of the latter (that is between the first rotor 12 and the second stator 13) is found the first recess C1, and downstream (that is between the second stator 13 and the second rotor 14) is found the second recess C2.

The first recess (or upstream recess) C1 and the second recess (or downstream recess) C2 are separated by a sealing plate (stator/shrouding) 20 extending from the platform of the second stator 13 (to which the plate 20 is attached) to the shaft 2. The plate 20 is a plate of substantially annular shape.

For the purpose of cooling, fluid is injected through the platform of the second stator 13, into the first recess C1, from which it leaves again through an interstice between the platforms of the first rotor 12 and the second stator 13.

However as one can also see in FIG. 2, a portion of this fluid escapes at the junction point between the plate 20 and the shaft 2, and joins the second recess C2, which it leaves again by an interstice between the platforms of the second stator 13 and the second rotor 14. This flow short circuits the second stator 13 and therefore causes a slight loss of efficiency.

To combat this phenomenon, attempts have been made to improve fluid-tightness at the junction point between the plate 20 and the shaft 2, for example by adding a labyrinth seal 21. The control of fluid-tightness at this point is complex, however, in that the plate 20 and the shaft 2 are mobile with respect to each other.

The invention improves the situation by resolving, simply and effectively, the problem of fluid tightness between the two inter-disk recesses C1 and C2.

PRESENTATION OF THE INVENTION

The present invention proposes a turbine assembly of a turbine engine, comprising at least a first bladed rotor, a bladed stator and a second bladed rotor arranged successively, the rotors being mounted on a shaft, a sealing plate extending between the stator and the shaft and separating a first recess arranged between the first rotor and the stator, from a second recess arranged between the stator and the second rotor, pressure-reducing means being positioned inside the first recess.

The assembly being characterized in that the pressure-reducing means comprise a plurality of substantially radial recompression fins extending into the first recess.

Here a turbine means in particular any high-speed turbine for which the control of fluid-tightness between the two inter-disk recesses requires effort in design and in manufacture. What is meant by a high-speed turbine is any turbine operating at pressures similar to those occurring in a high pressure turbine of an aircraft turbine engine. Such a turbine can be characterized as a high-speed turbine in comparison to a high-pressure turbine of a turbine engine also having a slower low-pressure turbine.

According to other advantageous and non-limiting features:
- said fins are arranged on a downstream face of the first rotor;
- the fins are arranged at a thinned portion of the first rotor;
- the first rotor comprises a plurality of blades, the turbine assembly comprising one fin for each blade of the first rotor;
- the fins have a curved distal end;
- said pressure-reducing means inside the first recess also comprise an auxiliary sealing plate arranged into the first recess facing the recompression fins;
- the fins and the auxiliary sealing plate have a complementary shape;
- the pressure-reducing means inside the first recess are configured to reduce by at least 50% a pressure difference between the first recess and the second recess;
- the pressure-reducing means inside the first recess are configured to reduce by at least 90% the pressure difference between the first recess and the second recess;
- said bladed stator is a second stator, the turbine assembly also comprising a first bladed stator arranged upstream of the first rotor.
- the pressure upstream of the stator is greater than the pressure downstream of the stator.

PRESENTATION OF THE FIGURES

Other features and advantages of the present invention will appear upon reading the description that follows of a preferred embodiment. This description will be given with reference to the appended drawings wherein:

FIG. 1 previously described shows a known turbine engine;

FIG. 2 previously described shows a two-stage turbine according to the prior art;

DETAILED DESCRIPTION

Fluid-tightness

Figure 1:
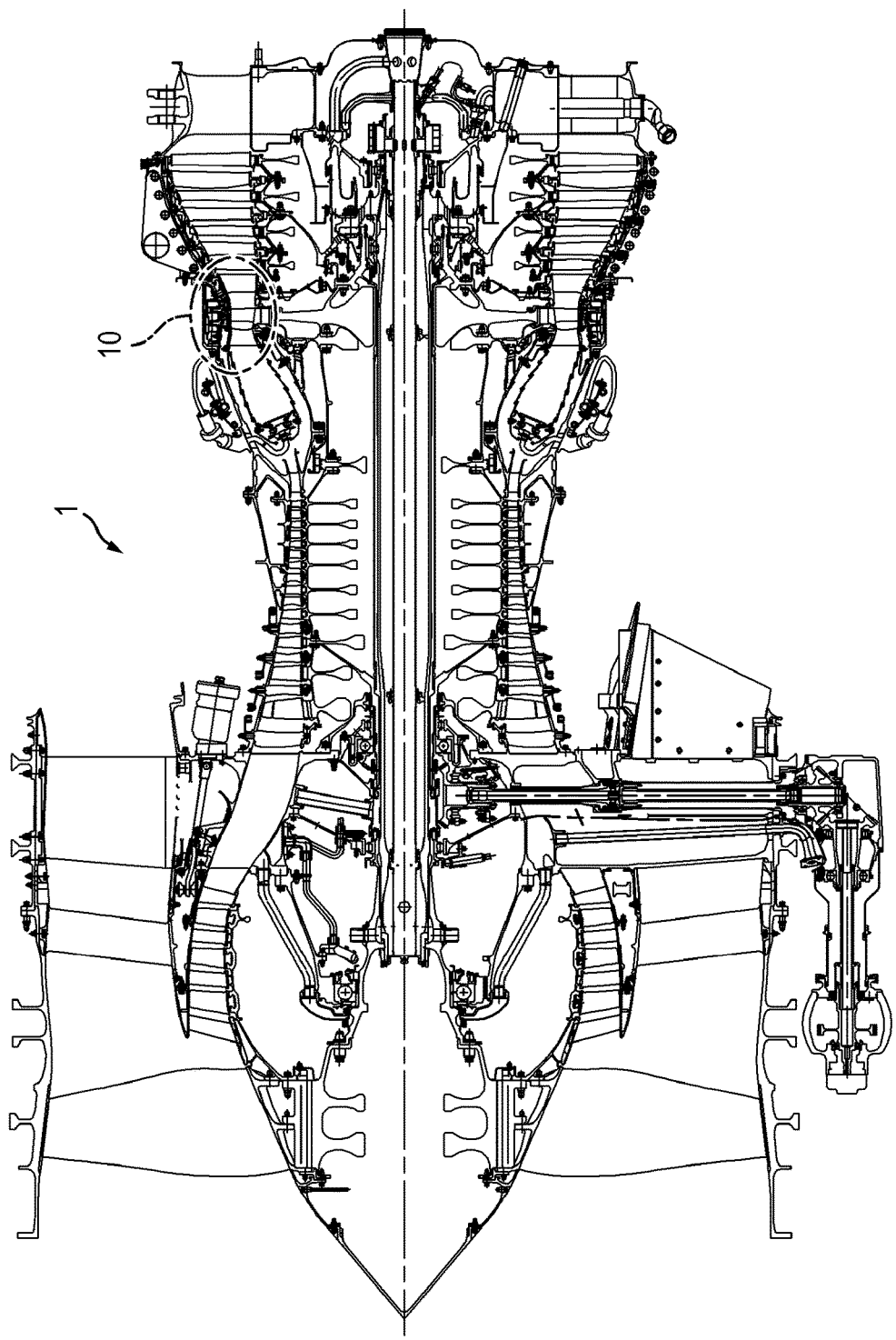
Figure 2:
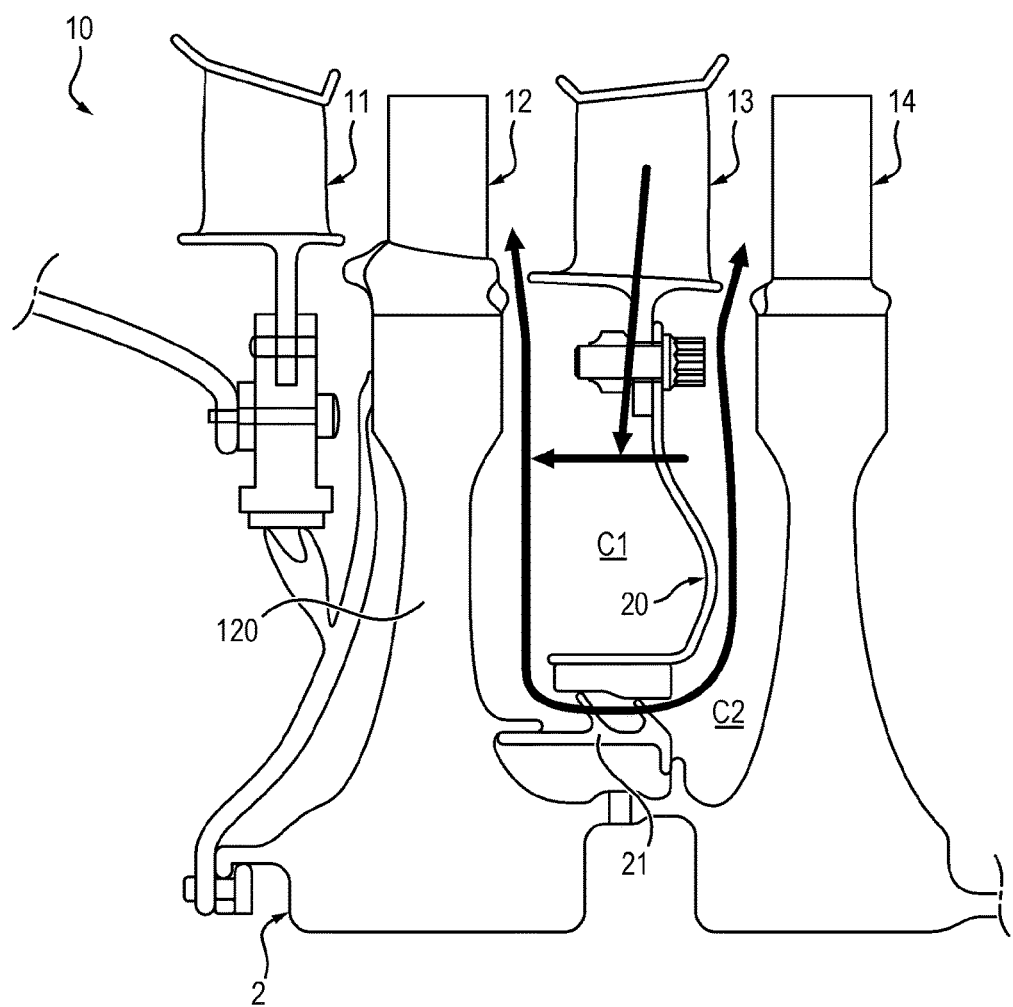
Figure 3A:
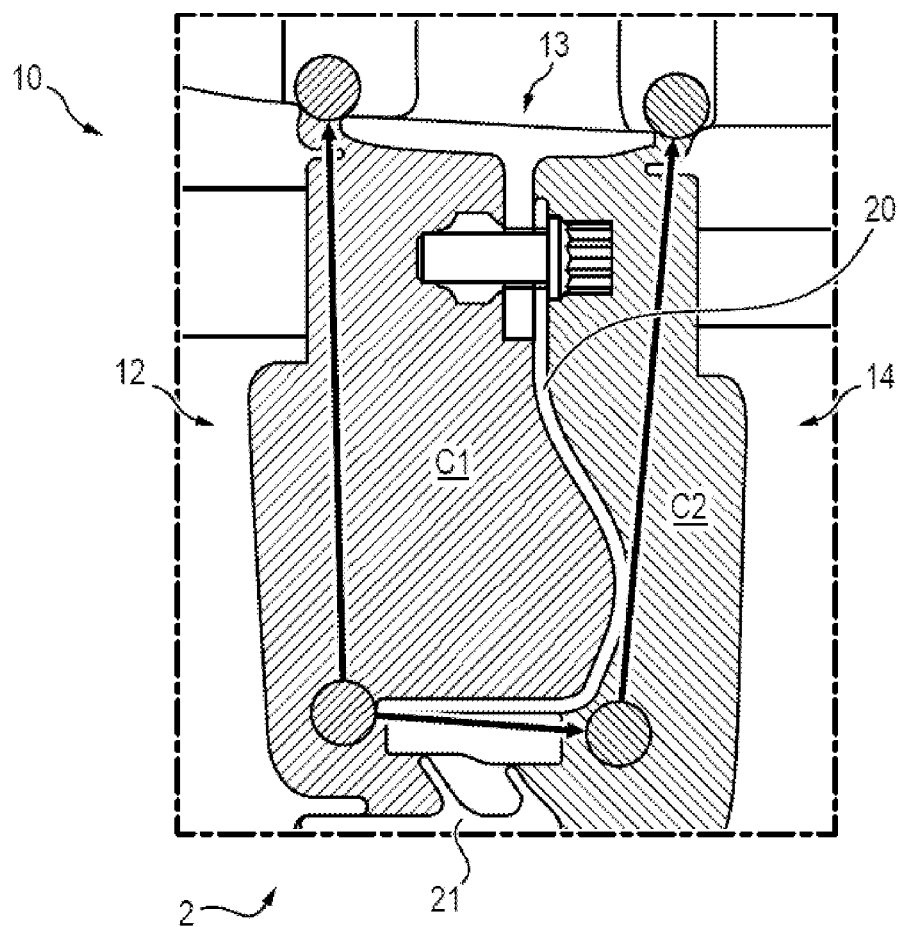
FIG. 3a shows a detail of a two-stage turbine according to the prior art.

With reference to FIG. 3a, the permeability of the inter-disk seal depends largely on the pressure environment prevailing in the inter-disk recesses C1 and C2, which is conditioned by the degree of expansion in the stream when passing the second stator 13. In fact, by definition the pressure diminishes at each member 11, 12, 13, 14 of the turbine, and in particular the pressure upstream of the second stator 13 is thus smaller than the pressure downstream of the second stator 13. In practice, the pressure $P_{downstream}$ downstream of this second stator 13 amounts to approximately 0.4 to 0.8 (advantageously approximately 0.5) times that $P_{upstream}$ of the stator 13. Typically, $P_{upstream}$ and $P_{downstream}$ are on the order of a few bar. This strong difference multiplies the possibility of leaks at the labyrinth seal 21.

It is always possible to improve the intrinsic performance of this seal, but aspects such as minimum assembly clearance, the integration of abradable cartridges of the NIDDA type, or use of space inside the inter disks ensure that it will never be able to be perfect.

The present innovation proposes to resolve the problems of inter disk permeability not by further increasing the seal performance at the seal 21, but by acting against the cause of this problem, to wit, the pressure difference between the two cavities C1 and C2.

More precisely, a turbine assembly 10 of a turbine engine 1 is proposed, comprising at least a first bladed rotor 12, a bladed stator 13 and a second bladed rotor 14 arranged successively. In practice, the bladed stator 13 is a second stator (as explained in the introduction), the turbine 10 also comprising a first stator 11 arranged upstream. In "upstream" or "downstream," it is the direction of flow of the fluid that is considered: leaving the compression chamber, the fluid will pass, in sequence, through the first stator 11, then the first rotor 12, then the second stator 13 and finally the second rotor 14. The first stator and rotor 11, 12 constitute a first stage of the turbine 10, and the second stator and rotor 13, 14 constitute a second stage. Preferably, the turbine 10 is two-staged, but alternatively it can comprise additional stages.

It will be understood that only the second stator 13 is essential inside the scope of the present turbine assembly 10, and it will be referred to hereafter in the description as "the stator" 13.

The rotors 12, 14 are mounted on a shaft 2. They have a plurality of radial blades extending over their entire circumference, starting from a platform which has an internal/external wall against which the air circulates, defining a stream.

In particular, a rotor 12, 14 can be in one piece (and thus support all the blades of the part 1), or formed from a plurality of elementary members each supporting a single blade (a blade "root") so as to constitute a blade. In the first case the term used is blisk, and in the second case bladed wheel. In one case, as in the blade, the rotor 12, 14 generally has a thinned portion 120 below its platform (for the purpose of mass reduction).

In the case of stators 11 and 13, the blades are attached to an external casing. They have a platform defining a radially exterior wall of the part 1 (the gas runs inside, the blades extend toward the center) and possibly a radially interior wall of the part 1 (the gas passes around it) by defining a hub, as for a rotor 12, 14.

The stators 11, 13 can also be single-piece or not, and fixed or having movable blades.

Moreover, a sealing plate 20 extends between the stator 13 and the shaft 2 and separates the first recess C1, arranged between the first rotor 12 and the stator 13, from the second recess C2 arranged between the stator 13 and the second rotor 14. As explained earlier, this is a plate with a substantially annular shape, generally terminated by a labyrinth seal 21.

And the present turbine assembly 10 resolves the problems of inter-disk permeability in that it also comprises pressure-reducing means 300, 31 inside the first recess C1.

Pressure Rebalancing

Figure 3B:
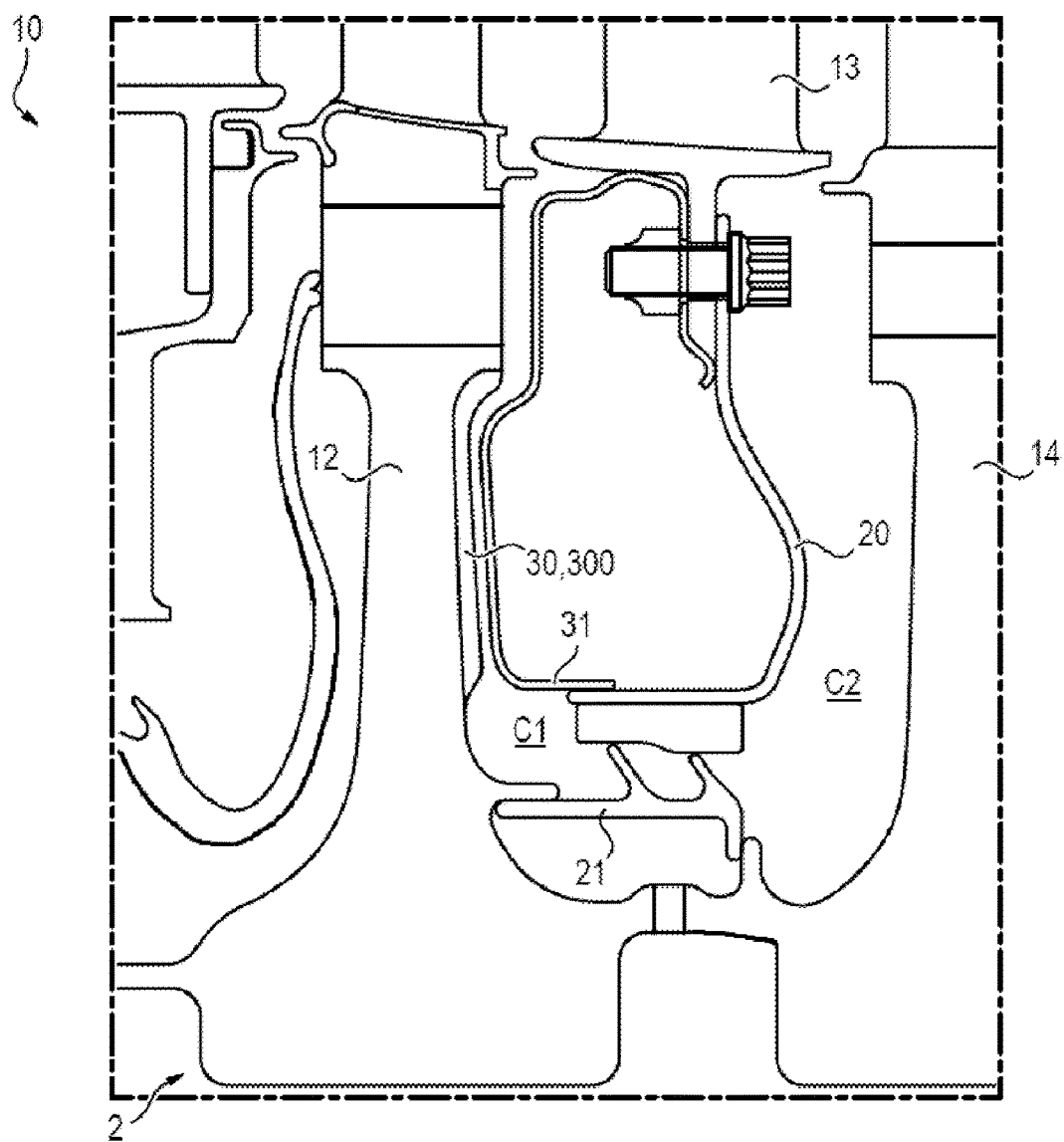
FIG. 3b shows an embodiment of a turbine according to the invention.

With reference to FIG. 3b, the pressure-reducing means 300, 31 inside the first recess C1 cause a reduction in pressure of p bar inside the recess C1, and to a much lesser extent that inside the recess C2 (by p' bar, p»p'. For this reason, hereafter in the present description, p' will be assumed to be zero). It should be noted that, insofar as the pressure in each of the recesses C1 and C2 may not be uniform, what is meant by "pressure inside the first recess C1" and "pressure inside the second recess C2" are the pressures inside the most central portion of each recess, respectively on either side of the labyrinth seal 21.

Returning to the foregoing examples, respective pressures (when the means 300, 31 are active) of $P_{C1}=P_{upstream}-X$ and $P_{C2}=P_{downstream}$ are obtained.

The pressure difference Δ between the two recesses C1 and C2 (i.e. the pressure gradient at the ends of the labyrinth seal 21) is reduced from $\Delta_i=P_{upstream}-P_{downstream}$ to $\Delta_f=P_{C1}-P_{C2}=P_{upstream}-P_{downstream}-X<P_{upstream}-P_{downstream}=\Delta_i$.

Preferably, the reduction in pressure is such that the pressure delta is considerably reduced, i.e. the tendency is toward balancing of the pressures of the first recess C1 and the second recess C2, i.e. $\Delta_f \rightarrow 0$, i.e. $X \rightarrow P_{upstream}-P_{downstream}$.

Thus, the pressure-reducing means 300, 31 inside the first recess C1 are advantageously configured so that the pressure difference Δ is at least divided in two (i.e. $\Delta_f \leq 0.5\Delta_i$, in other words $X \geq 0.5 \times (P_{upstream}-P_{downstream})$), perhaps at least divided by ten (i.e. $\Delta_f \leq 0.1\Delta_i$, in other words $X \geq 0.9 \times (P_{upstream}-P_{downstream})$).

The reduction or even the cancellation of the difference in pressure between the first and the second recesses C1 C2 reduces or even nullifies the problem of sealing: if the pressures are equal, there is no longer a flow from the first recess C1 to the second recess C2 even when sealing is imperfect.

It will be understood that numerous embodiments of the pressure-reducing means 300, 31 inside the first recess C1 are possible, beginning with mechanical suction inside the first recess C1.

Preferably, a plurality of recompression fins 300 is used which reproduces the effect of a "local" centrifugal compressor as shown in FIG. 3b.

Centrifugal Compressor

A centrifugal compressor is a mechanism which drives the fluid in rotation around the axis 2, and consequently drives by centrifugal force the forced transfer of fluid from the bottom of the recess C1 (the center) toward the top (the outside, at the junction with the stream), i.e. its radial displacement. This thus generates a pressure gradient.

More precisely, it is recalled that for a fluid system in rotation, the static pressure equilibrium law is given by the equation:

$$\frac{dP}{dr} = \rho w_{air}^2 r = \rho Ke^2 w_{rotor}^2 r$$

With:
ρ: mass per unit volume of the air in kg/m³
r: radius in m
$w_{air}$: rotation speed of the air in rad/s
$w_{rotor}$: rotation speed of a solid in rad/s $$Ke: \text{entrainment coefficient} = \frac{w_{air}}{w_{rotor}}$$

The centrifugal compressor thus creates, by putting the fluid into rotation, an adverse pressure gradient balancing the centrifugal effect in the first recess, which is maximized when Ke is maximized.

It will thus be understood that a compressor, though it is by definition a device designed to cause a rise in pressure in a given zone (here the junction between the recess C1 and the stream upstream of the stator 13), also has the effect of causing a reduction in pressure in another zone (here inside the recess C1, i.e. farthest toward the center) where the fluid is "pumped." The use of a compressor as a pressure-reducing means can thus seem paradoxical but does not cause any problem.

Fins

Preferably, the effect of a centrifugal compressor is obtained by a plurality of substantially radial recompression fins 300 extending into the first recess C1. In other words, the pressure-reducing means 300, 31 comprise said plurality of recompression fins 300.

Insofar as the first rotor 12 already constitutes a solid in rotation of the recess C1, it is sufficient to arrange the fins 300 on a downstream face of the first rotor 12. Thus, the rotation of the rotor 12 naturally and automatically drives the desired effect of centrifugal compression and pressure reduction inside the first recess C1. The fins 300 are configured to maximize the coefficient Ke.

It will be noted that it is already known to arrange recompression fins in a turbine, but never in a first recess C1, and even less so on a downstream face of the first rotor 12 and a fortiori not for the purpose of reducing the pressure inside the first recess C1.

For example, the application U.S. Pat. No. 4,759,688 proposes recompression fins facing the upstream face of the first rotor. Such fins (which it will be noted are integral with the stator) are used only for pumping fluid for the purpose of promoting fluid circulation in the first rotor, and hence its cooling. They have nothing to do with the present fins 300 which turn with the first rotor 12.

Figure 4A:
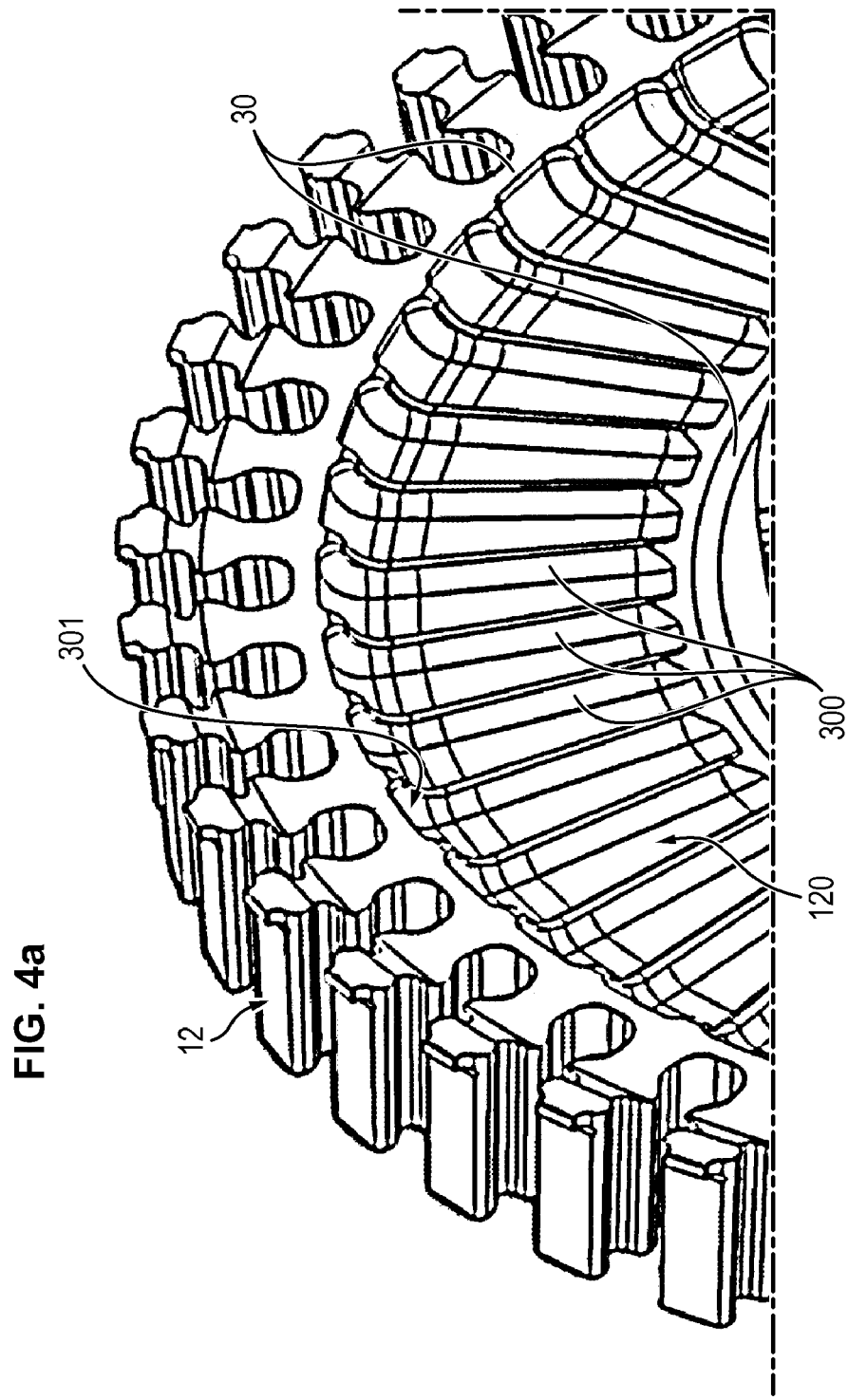
FIGS. 4a-4b show embodiments of a first rotor of a turbine according to the invention.

Referring to FIG. 4a which shows the rotor 12, the fins 300 are preferably arranged at the thinned portion 120 of the first rotor 12. At the end of this thinned portion, the fins 300 have a curved distal end 301. It is desirable to continue these fins as close to the stream as possible.

Such a configuration is preferred in the case of so-called ventilation by the rotor (12) (that is at the bottom of the first recess C1) or ventilation by the stator 13 (as mentioned in the introduction). In fact, the fins 300 are found here directly at the outlet of the feed holes (for cooling) of the first rotor 12 (near the labyrinth seal 21). The outlet radius of the fins 300 is the result of a mass/mechanical strength/performance gain compromise.

Alternatively, in the case of so-called ventilation "through the bottom of the cell," that is below the platform of the first rotor, it is desirable to position the fins 300 higher than the thinned portion 120, that is starting from the radius of the bottom of the cell up to the stream to retain Ke=1 during the rise, so as to limit entry head losses in the "ducts" generated by the fins.

Figure 4B:
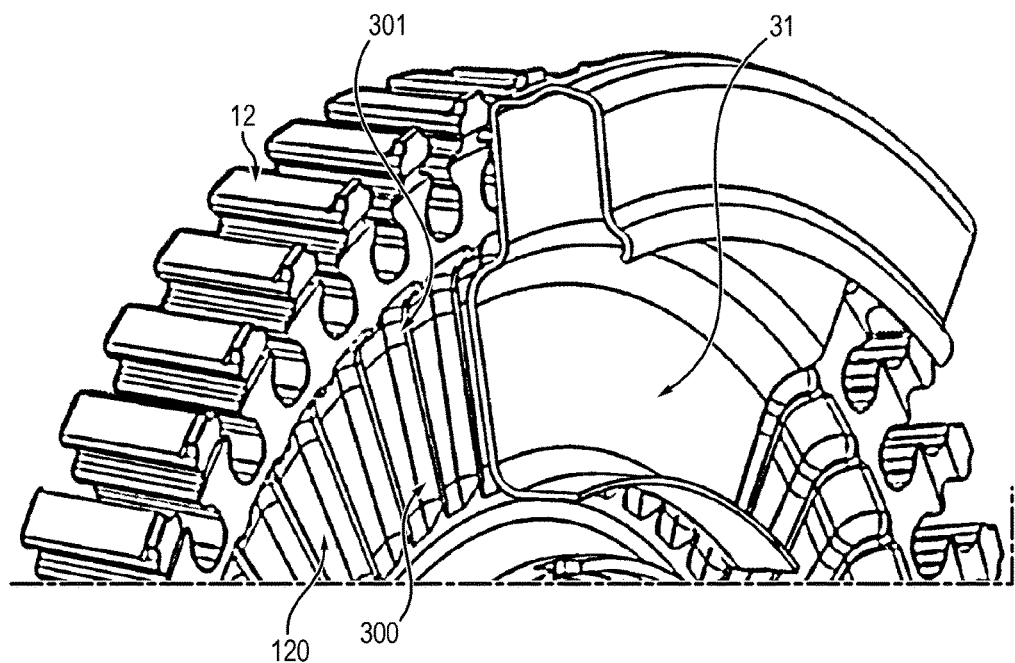

In any case, it is preferable that there be as many fins 300 as there are blades around the rotor 12 (i.e. holes if, as in FIG. 4, the rotor is a wheel capable of receiving the blades, which are separate). Moreover, it is preferable that the radial passage cross-section is large (limitation of head losses) and that the fins 300 be thin (limitation of mass addition).

It is noted that the addition of fins 300 will reduce the exchange coefficients between the air and the first rotor 12 (Ke is as close as possible to 1, so the relative tangential speed between the disk of the rotor 12 and the fluid is practically zero), which causes a reduction in the "sensitivity" of the rotor to the temperature of the air on the downstream face, which makes possible:
thermal control of the first rotor 12;
reduction of the axial thermal gradient in the case of possible additional recompression fins on the upstream face, hence a reduction in the disk spillage and improvement of the rotor/stator clearance.

Moreover, the fins 300 increase the response time of the first rotor 12, which allows slowing of the first rotor 12 during the acceleration and deceleration phase, hence a reduction in the peaks of rotor/stator clearance use and a reduction in the risk of associated wear.

Auxiliary Plate

To amplify their effect, the fins 300 can be accompanied with an auxiliary sealing plate 31 arranged in the first recess C1 facing said fins 300. Such an auxiliary plate 31, visible in FIG. 3b and FIG. 4b, reduces the air gap, reduces head losses, and makes it possible to more easily cause Ke to approach 1 (because the fluid is constrained to rotate at the speed of the first rotor 12).

The invention claimed is:

1. A turbine assembly for an aircraft turbine engine, comprising at least a first bladed rotor, a bladed stator and a second bladed rotor arranged successively, the rotors being mounted on a shaft, a sealing plate extending between the stator and the shaft and separating a first recess arranged between the first rotor and the stator, from a second recess arranged between the stator and the second rotor, pressure-reducing means being positioned inside the first recess wherein said pressure-reducing means comprise a plurality of substantially radial recompression fins extending into the first recess.

2. The assembly according to claim 1, wherein said fins are arranged on a downstream face of the first rotor.

3. The assembly according to claim 2, wherein the fins are arranged at a thinned portion of the first rotor.

4. The assembly according to claim 2, wherein the first rotor comprises a plurality of blades, the turbine assembly comprising one fin for each blade of the first rotor.

5. The assembly according to claim 2, wherein the fins have a curved distal end.

6. The assembly according to claim 1, wherein said pressure-reducing means inside the first recess also comprise an auxiliary sealing plate arranged into the first recess facing the recompression fins.

7. The assembly according to claim 1, wherein said pressure-reducing means inside the first recess also comprise an auxiliary sealing plate arranged into the first recess facing the recompression fins, wherein the fins and the auxiliary sealing plate have a complementary shape.

8. The assembly according to claim 1, wherein the pressure-reducing means inside the first recess are configured to reduce by at least 50% a pressure difference between the first recess and the second recess.

9. The assembly according to claim 8, wherein the pressure-reducing means inside the first recess are configured to reduce by at least 90% the pressure difference between the first recess and the second recess.

10. The assembly according to claim 1, wherein the bladed stator is a second stator, the turbine assembly also comprising a first bladed stator arranged upstream of the first rotor.

11. The assembly according to claim 1, wherein the pressure upstream of the stator is greater than the pressure downstream of the stator.

* * * * *